United States Patent
Roll et al.

[11] Patent Number: 5,618,088
[45] Date of Patent: Apr. 8, 1997

[54] ANTI-LOCK CONTROL SYSTEM

[75] Inventors: Georg Roll, Heusenstamm; Heinz-F. Ohm, Weiterstadt, both of Germany

[73] Assignee: FAG Kugelfischer Georg Schafer KGaA, Germany

[21] Appl. No.: 457,032

[22] Filed: Jun. 1, 1995

Related U.S. Application Data

[63] Continuation of Ser. No. 279,277, Jul. 22, 1994, abandoned, which is a continuation of Ser. No. 59,913, May 10, 1993, abandoned.

[30] Foreign Application Priority Data

May 9, 1992 [DE] Germany ............... 42 15 350.6

[51] Int. Cl.$^6$ ...................................... B60T 8/58
[52] U.S. Cl. ...................................... 303/158
[58] Field of Search .................. 303/100, 102, 303/103, 108, 113.1, 116.1, DIG. 2–4, 158, 156; 364/426.02

[56] References Cited

U.S. PATENT DOCUMENTS

4,320,459  3/1982  Lindemann et al. ........... 303/111 X
4,783,127  11/1988  Kade et al. ........................ 303/104 X
5,195,811  3/1993  Buschmann et al. ............ 303/116.1

*Primary Examiner*—Lee W. Young
*Attorney, Agent, or Firm*—Ostrolenk, Faber, Gerb & Soffen, LLP

[57] ABSTRACT

In order to achieve an optimal pressure build-up function in an anti-lock braking control system for automotive vehicles and to maintain the pressure at the optimal point for long periods of time and thus achieve better brake deceleration with greater stability of travel and greater comfort than with conventional ABS control systems, the anti-lock braking control system includes, in addition to the ABS controller and monitoring circuit (3), a pressure function generator (4) which, for each wheel, intermediately stores an intermediate brake pressure value whenever wheel overbraking has been noted. Then, in the pressure build-up phase, the pressure function generator (4) gives off a signal to the pressure modulator in order to increase the wheel brake pressure in accordance with an exponential function.

19 Claims, 7 Drawing Sheets

ANTI-LOCK CONTROL SYSTEM

This is a Continuation of application Ser. No. 08/279,277 filed on Jul. 22, 1994, now abandoned which is a Continuation of application Ser. No. 08/059,913, filed on May 10, 1993, now abandoned.

BACKGROUND OF THE INVENTION

The present invention relates to an anti-lock control system for motor vehicles including wheel sensors, a monitoring circuit which recognizes overbraking conditions of the wheels based on the signals from the sensors and produces corresponding control signals, and a pressure modulator which, by means of the control signals, sets the brake pressures on the vehicle wheels.

ABS control systems switch cyclically between the typical "decreasing pressure," "maintaining pressure," and "pressure build-up" phases. Knowledge of pressure reference points, in addition to the determination of suitable switching times, is of decisive importance in order to obtain large uniform braking decelerations of the vehicle with the greatest possible comfort.

If one assumes uniform conditions of the pavement and furthermore assumes that the properties of the tires and brakes do not change substantially during braking, an anti-lock system could achieve optimal braking by establishing a brake pressure which lies a differential amount below the locking pressure on each wheel that is in danger of locking. This pressure could be stored for each wheel, the first time a tendency toward locking occurs while braking. Since this optimal pressure, which has been determined upon counteracting the tendency towards locking, is below the locking pressure, the braking could then be carried out to the end with maximum deceleration, good travel stability and high control comfort. Should a wheel nevertheless tend to lock after the optimal pressures have been established in this way, the adjustment process would be repeated on basis of a newly determined locking pressure.

This simple strategy, however, cannot be employed in practice, since wheel locking pressures may be subject to substantial variations for the following reasons:

- Although practically all actual braking takes place with more or less homogeneous conditions of the pavement, enormous local variations in coefficient of friction nevertheless can occur.
- The dynamic behavior of the vehicle leads to changes in the wheel contact forces (in particular, changes in load caused by curves or by vehicle pitching, caused in turn by changes in deceleration during the initial braking phase).
- During braking from high initial speed, the characteristics of the tires may change greatly due to heating.
- The brake system may exhibit fading effects during a lengthy braking, so that setting a constant brake pressure leads to a brake force which decreases with time.

It therefore may be necessary, in the extreme case, to further increase the brake pressure on one or more wheels which traveling in a stable wheel slippage region, in order to again obtain the main brake cylinder pressure desired by the-driver and thereby obtain dependable controlled braking.

Furthermore, after a tendency towards locking has just been counteracted, it is not permissible for the pressure to return as rapidly as might be desired into the vicinity of the former locking pressure, since changes in the wheel contact forces caused by the spring suspension can lead to dynamic changes in the locking pressure.

SUMMARY OF THE INVENTION

The object of the present invention is therefore to create an anti-lock control system of the aforementioned type which has an optimal pressure build-up function, and is able to advantageously maintain the brake pressure at the optimum point for long periods of time, and thus provides better braking deceleration with greater stability of travel and higher control comfort than in the case of conventional ABS control systems.

The anti-lock control system according to the disclosed embodiments of the invention therefore does not build up the pressure in the reloading phase with a constant gradient. Rather, the system first increases the braking pressure steeply, and then less and less, finally approximating the locking pressure to be expected. By the use of such a pressure build-up function, which may be an exponential loading ramp, a good pressure level is obtained from the beginning and is maintained for long periods of time on a uniform substrate.

The reduction in the wheel speed to be expected at the end of the loading ramp accordingly takes place gently, in general, due to the flat final slope of the ramp, and can easily be controlled.

A basic condition that makes this pressure build-up method successful is the course of the pressure function between good pressure reference points.

In this connection, the system provides information with regard to the pressure present in the wheel brake cylinder circuit to the ABS controller. This information involves not absolute pressures, but merely pressure ratios.

By the use of plunger pressure modulators (see, for instance, Federal Republic of Germany OS 35 30 280), the high cost of the brake pressure generator is avoided in a simple manner.

Other features and advantages of the present invention will become apparent from the following description of the invention which refers to the accompanying drawings.

BRIEF DESCRIPTION OF VARIABLES AND CONSTANTS

The variables and constants used in this disclosure have the following meanings:

| | |
|---|---|
| S = | signal from a wheel sensor which permits a determination of the actual circumferential speed V of the wheel in question |
| V = | instantaneous wheel circumferential speed |
| A = | filtered wheel deceleration/acceleration |
| VREF = | calculated vehicle reference speed (is formed from filtered wheel speeds and plausibility considerations) |
| AREF = | filtered vehicle deceleration, derivative of VREF with respect to time (gives an estimated vehicle deceleration which may vary due to the short control cycle times; for this reason, this signal is generally filtered; AREF is accepted as such a filtered vehicle deceleration) |
| RE = | display signal for wheel speed breakdown, i.e., a rapid decrease in wheel speed which causes the wheel to enter the unstable slippage region (a Boolean 1-bit signal which is placed at logical "1" when the wheel speed due to overbraking enters into too large a slippage range and at logical "0" when the actual wheel slippage is stable) |
| DeltaVhalt = | difference in speed which the wheel experiences during the time deltaThalt |
| deltaThalt = | duration of the pressure maintenance phase during the acceleration of the wheel in stable slippage, described further hereinbelow |
| Tein_i = | time at which a wheel speed breakdown caused by overbraking is recognized for the i-th time within a control braking cycle |
| Thalt_i = | time at which a pressure maintaining phase which therefore accelerates the previously overbraked wheel starts for the i-th time within a control braking cycle |
| Taus_i = | time at which a wheel speed breakdown is counteracted for the i-th time within a control braking cycle |
| TS = | time at which the search ramp is activated |
| TPauf = | permissible duration of the pressure build-up, within which a new wheel-locking tendency is expected |
| P = | wheel brake cylinder pressure (this pressure is set upon control braking by the ABS controller; the mechanisms disclosed here can influence P indirectly via the ABS controller; with the concept indicated here, it is assumed that P is detected either by a pressure measuring instrument or that, for instance, when using an ABS pressure modulator based on the plunger principle, there is a direct relationship between the measurable position of the front wheel pressure piston and the relative front wheel brake pressure so that P can be read as a relative value from the corresponding position of the piston) |
| Palt = | wheel brake pressure P of the previous control cycle |
| PS = | desired value for the brake pressure to be set (is calculated by the pressure function generator in the pressure build-up phase and transmitted to the ABS controller) |
| PSneu = | new value of PS for the next control cycle |
| Pein = | value of P at which the wheel exhibits locking tendencies |
| Pein_i = | value of P at which the front wheel speed breaks down for the i-th time during a control braking cycle |
| Pbeschl = | value of P at which the wheel whose speed previously broke down again accelerates |
| PSAnf = | pressure start point serving as a starting pressure point for the pressure reloading ramp |
| DPSAnf = | minimum distance from PSAnf to Pein based on wheel, axle and vehicle dynamics |
| DeltaPauf = | amount of pressure by which the wheel brake pressure is increased from one control cycle to the next in the reloading phase |
| DeltaPMin = | minimum amount of pressure by which the wheel brake pressure is increased from one control cycle to the next in the reloading phase |
| DeltaPMax = | maximum difference in pressure between Pein and Pbeschl, upon the exceeding of which the pressure start point PSAnf is calculated on the basis of Pbeschl |
| Pab = | enclosed wheel brake pressure upon the closing of the main brake cylinder valve (plunger-pressure modulator) |
| K1, K2 = | constants for the calculation of the brake pressure functions |
| z = | plunger piston position set (plunger pressure modulator) |
| Control cycle time = | clock signal which is switched with the duration of an ABS control cycle, in this case 8 msec, corresponding to 125 Hz |
| g = | acceleration of gravity = 9.81 m/s$^2$ |

DETAILED DESCRIPTION OF EMBODIMENTS OF THE INVENTION

Figure 1:
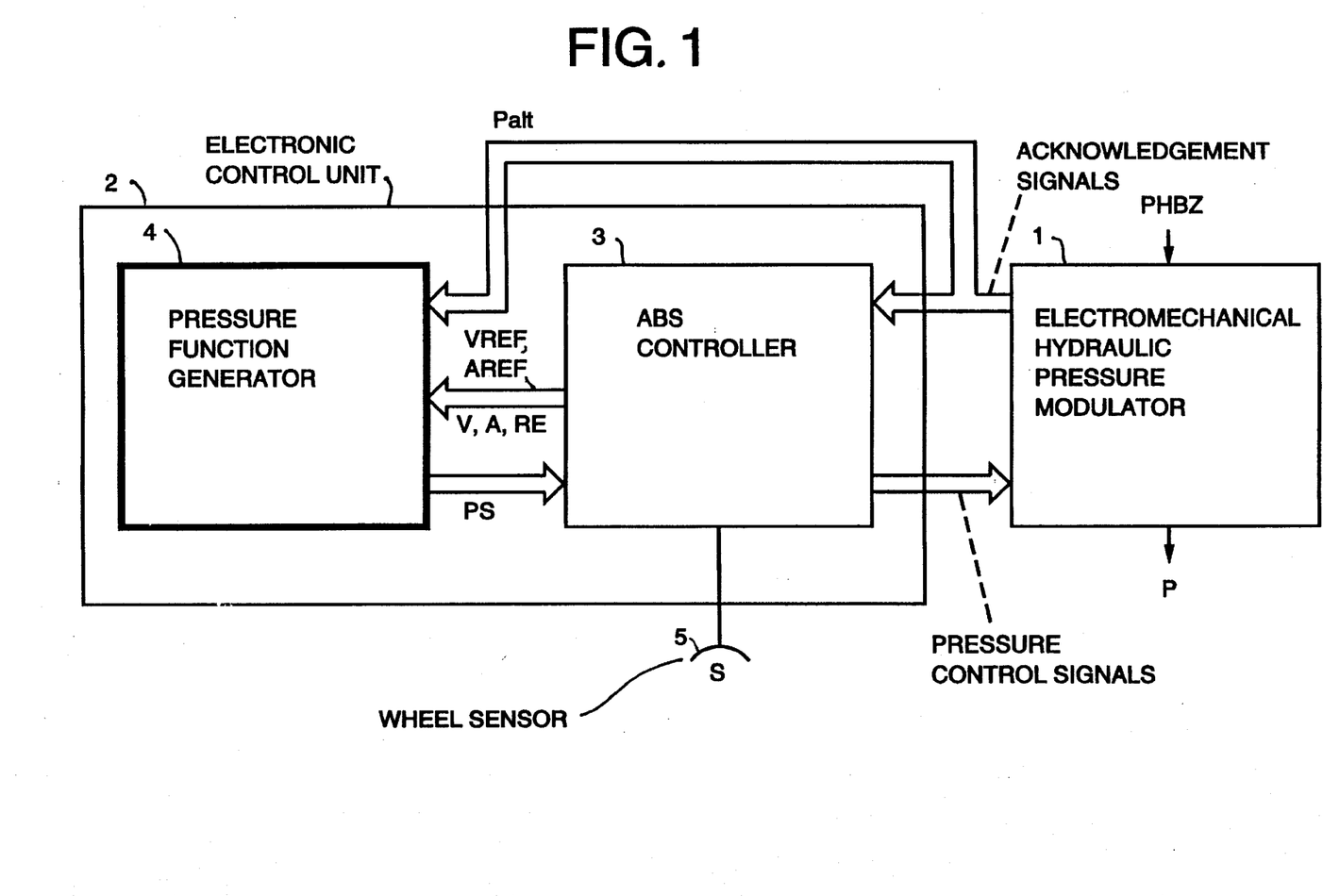
FIG. 1 is a functional block diagram of an embodiment of the invention, showing the modulator, ABS controller, and pressure function generator.

FIG. 1 shows a block diagram of an anti-lock system, comprising an electro-mechanical-hydraulic pressure modulator 1 and an electronic control unit 2 which, in addition to the ABS controller 3, also contains an auxiliary circuit 4 which carries out the control strategy and therefore is referred to as a "pressure function generator". The function blocks 3, 4 can be formed either by special hardware or by a software implementation.

For reasons of easy viewing of the drawing, the mechanisms shown here are indicated for only one vehicle wheel or only for one brake channel, so that FIG. 1 and all further figures in all cases show only single-channel components.

A broadening of the concept to channels is readily possible since there are no channel-overlapping interrelationships and the mechanisms can therefore be considered separately for each wheel or each brake channel.

The data and signals specific to each wheel and brake channel would, in the case of expansion to several channels, have to be provided with corresponding subscripts, which have also been omitted here for reasons of easier viewing.

The functional relationships of the blocks 1, 3, 4 will now be described, including the pressure function generator 4 in combination with the other components in an anti-lock system. The ABS controller 3 receives from a wheel sensor 5 a train of pulses S. From the frequency of the pulse train S, it directly calculates the actual circumferential speed V of the vehicle wheel in question. From V, the ABS controller 3 determines further internal reference signals, such as for instance the vehicle reference speed VREF and the vehicle reference deceleration AREF, so that it can recognize conditions of overbraking and dependably counteract them.

In case of overbraking, the ABS controller 3 gives off pressure control signals to the pressure modulator 1 so that the latter reduces the main brake cylinder pressure PHBZ established by the driver and conducts it as a modified wheel brake cylinder pressure P to the wheel brake circuit. The pressure modulator 1 transmits acknowledgment signals to the ABS controller 3, including information with regard to the brake pressure P that has been set, and therefore, in the case of a plunger pressure modulator (see, for example, Federal Republic of Germany OS 35 30 280, to the pressure-determining position of the plunger piston.

The internal reference signals are also supplied to the pressure function generator 4.

The ABS controller 3 performs the anti-lock control process in accordance with known basic strategies. In parallel with this, the pressure function generator 4 calculates optimal pressure reloading gradients in the pressure build-up phases and transmits them to the ABS controller 3, so that the latter can refine its basic control strategy with the data from the pressure function generator 4.

The ABS controller 3 and pressure function generator 4 therefore operate in parallel. The basic functions of the ABS controller 3 are assumed to be known and are not described in detail. In a practical embodiment, the ABS controller 3 and the pressure function generator 4 are generally implemented as one component. A logical separation is effected here only in order to make clear the distinct functions of the pressure function generator 4.

Figure 2:
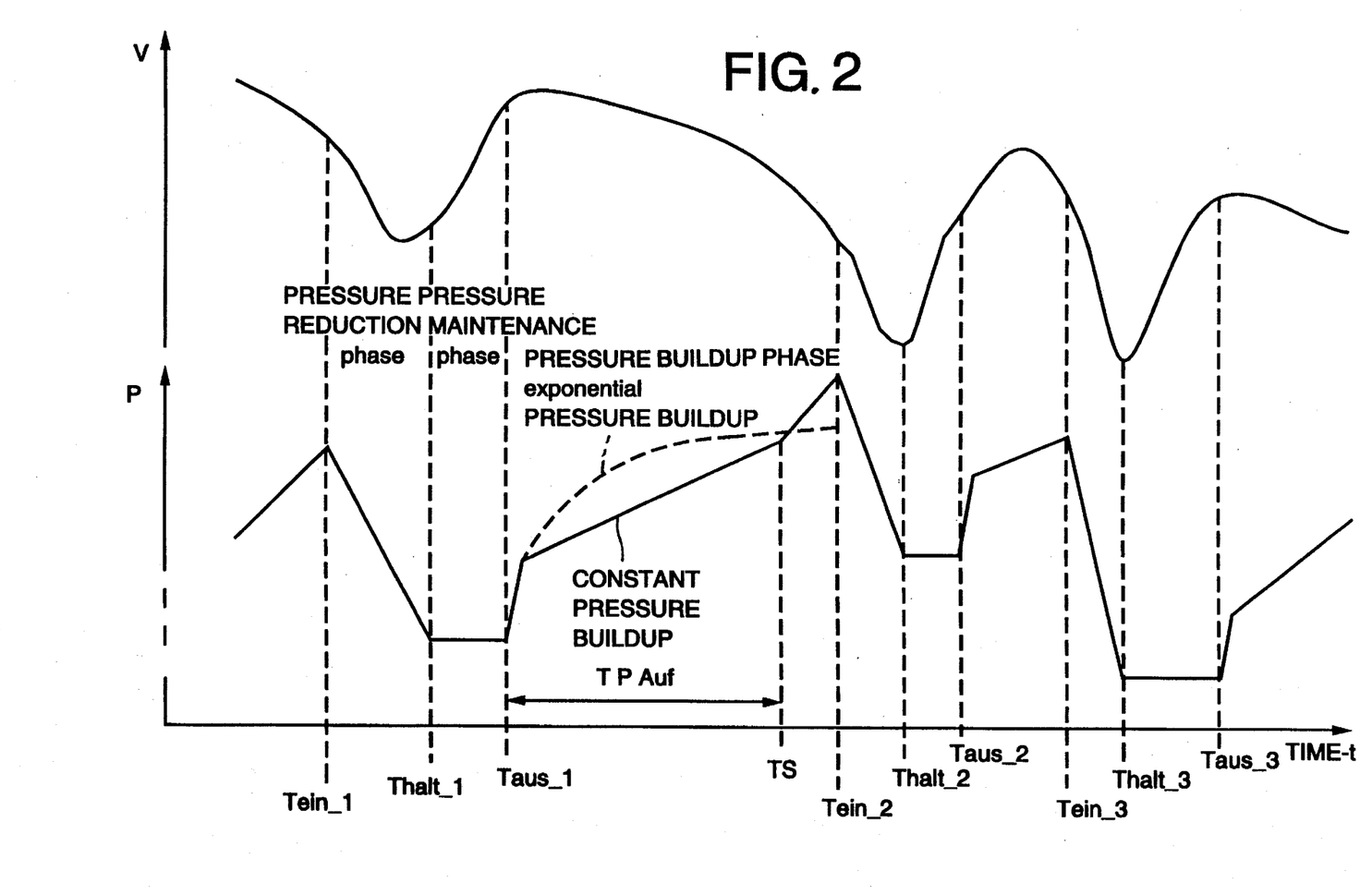
FIG. 2 is a time graph of a control braking cycle with a conventional anti-lock control system, and also certain features of the invention.

Conventional anti-lock systems switch cyclically between the control conditions "reduction of pressure", "maintenance of pressure" and "pressure buildup" for each wheel. In this connection, FIG. 2 shows, by way of example, an anti-lock control cycle on uniform pavement. A release of pressure takes place customarily whenever the wheel in question exceeds a maximum permissible value of deceleration with sufficiently high slippage. This situation is present at each of the times Tein_i.

Then, when the wheel passes from the previous deceleration into the acceleration phase and therefore travels again in the direction of stable slippage regions (as occurs at the times Thalt_i), the pressure that has been reached is maintained.

Another pressure build-up then takes place when the wheel is again definitely traveling in the stable slippage region (as at times Taus_i), in which connection, generally, a large pressure change and then a continuous pressure build-up with constant gradient takes place (in the following referred to as the "pressure build-up phase" or "reloading phase"). This phase continues until another wheel speed breakdown has been brought about during the reloading phase, whereupon another pressure decrease phase is begun. If, within a fixed predetermined pressure-build-up time TPAuf, no such wheel speed breakdown should occur, a steeper pressure ramp (referred to as a "search ramp") is followed, as commences here at the time TS, with the result that the pressure set does not lie too far from the possible maximum.

When using the method of constant pressure build-up just described, wheel speed overbraking is always caused with very high dynamics, so that exceeding the maximum of the µ slippage curve is unavoidable. The pavement-caused wheel drive becomes smaller, thereby increasing the locking tendency, the further the wheel enters into the unstable slippage region. Therefore, a sharp decrease in pressure is then necessary in order to again counteract the wheel speed. Strong pressure modulations result in uncomfortable behavior, particularly in the case of two-wheel vehicles, produce load on the axle mechanism, and practically always lead to losses in the deceleration of the vehicle.

Stable vs. Unstable Slippage

The wheel slippage s in a motorcycle, for example, is defined as $$s = \frac{v\_m - v\_w}{v\_m}$$

where $v\_m$ is the speed of the motorcycle and $v\_w$ is the rotational speed of the wheel considered.

Figure 7:
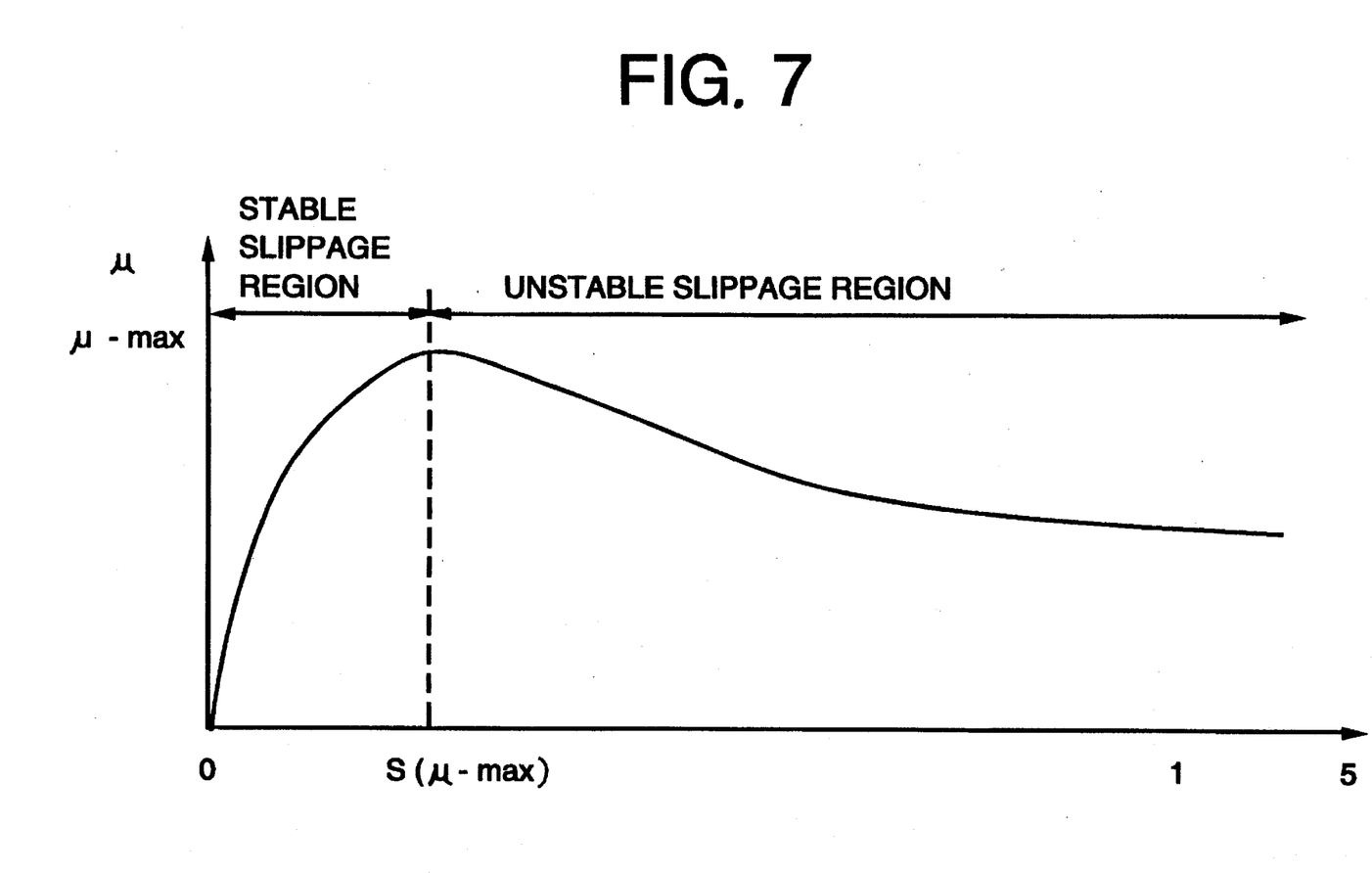

The friction µ between tire and road surface is a function of the slippage s, as shown in FIG. 7.

A slippage s>0 is necessary to obtain motorcycle deceleration during braking.

The stable slippage region is the lower range of s, namely s<s(µ_max); and the unstable slippage region is the upper range, namely s≧s(µ_max).

The anti-lock system works as a feedback system with the task to keep the wheel in the stable slippage region near the maximum friction µ_max. This is theoretically possible by setting a constant wheel braking pressure which is slightly lower than the wheel lock pressure. This slippage region is called "stable", because a constant wheel pressure leads to a constant slippage value 0≦s≦s(µ_max). However, it is not possible to hold a slippage value in the unstable slippage region by applying a constant pressure to the wheel. The slippage immediately would increase to "1", which means, that the wheel would lock. This is caused by the fact that the friction µ decreases with increasing slippage s, when the wheel operates in the region s>s(µ_max). Therefore, the slippage region s≧s(µ_max) is called the "unstable region".

Hereinafter, the term "excessively large slippage region" will be employed to mean extremely high values of s (s>>s(µ_max).

The anti-lock system tries to set braking pressure values which result in operation in stable slippage regions near s(µ_max), in order to get short braking distances.

When the braking pressure rises above a critical maximum value (wheel lock pressure), the slippage s passes over s(µ_max) and "wheel breakdown", occurs, that is, a sharp reduction in wheel speed which causes the wheel to enter the unstable slippage region. The anti-lock system employs those observed "locking tendencies" in order to be sure that the wheel is operated near the maximum friction µ_max.

A problem, however, is the unstable state of the slippage when a breakdown begins. The anti-lock system reduces the wheel pressure in order to accelerate the wheel into the stable slippage region, because the pressure which leads to the breakdown would cause a complete wheel locking (s=1).

If the anti-lock system increases the pressure very fast in order to find the maximum friction immediately, the breakdown of the wheel speed will lead to operation in "excessively large slippage regions" and the anti-lock system must reduce the wheel pressure by large amounts in order to bring the wheel back into the stable region.

An important advantage of the present invention is that it is capable of "traveling very slowly into the unstable slippage" region, which means increasing the wheel pressure very slowly, when the maximum friction has nearly been reached. So the wheel breakdown happens slowly, too, and the anti-lock system can keep the wheel in the stable region by reducing the wheel pressure only slightly. This results in better comfort during controlled braking and the braking distances are shortened.

Figure 3:
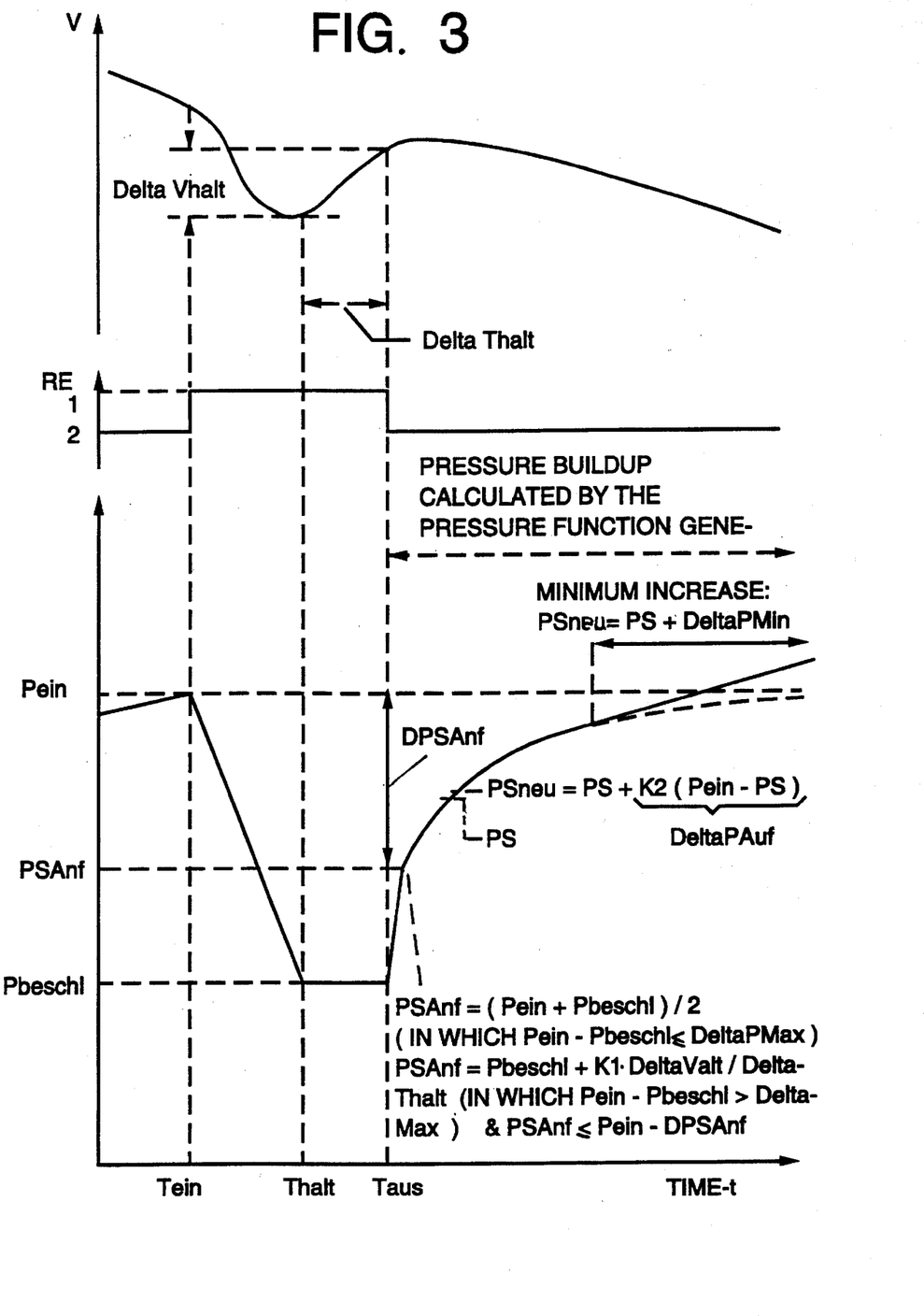
FIG. 3 is a time graph of a control braking cycle according to an embodiment of the invention, showing the pressure storage points and the pressure build-up profile.

FIG. 3 shows, for a control braking cycle, a time graph of the wheel speed and the wheel brake pressure which represents the pressure build-up function which is generated by the mechanisms described below.

Storage of the Wheel-Locking Pressure

When the ABS controller notes that there is a tendency towards wheel locking due to overbraking, the pressure build-up phase terminates and switching takes place to the pressure reduction phase. At this time Tein, the ABS controller switches a signal RE from "0" to "1" (wheel speed breakdown). The wheel brake cylinder pressure (or the piston position at the channel concerned) is now stored in a register as wheel-locking pressure Pein. For providing further control, it can then be assumed that this pressure point is slightly too high, in the case of uniform pavement.

Speed-Proportional Release of Load with Minimal Gradient

If wheel overbraking has been recognized, a decrease in pressure takes place by an amount which is calculated in each control cycle proportionally to the wheel speed gradient. In the case of a strong tendency towards locking, the pressure is therefore reduced more strongly than in the case where the entry has been slow into the excessively large slippage regions. In order, however, to counteract the entrainment effects which are to be expected, a fixed minimum pressure reduction is always produced, even if the wheel is traveling very slowly into unstable slippage. It is assumed that the ABS controller itself passes through such a decrease in pressure, so that the pressure function generator 4 does not perform this function.

Storage of the Wheel Acceleration Pressure

The pressure reduction phase continues until the wheel which has entered into excessive slippage regions is again clearly accelerated. At this time (Thalt), the pressure maintenance phase commences, i.e. the ABS controller maintains the brake pressure that has been reached. Should the measured deceleration of the vehicle be very small, permitting the conclusion that the pavement has a low coefficient of friction, the ABS controller can intentionally place the pressure maintenance point somewhat lower, so that the wheel accelerates better and for a shorter period of time travels in the unstable slippage region, which is particularly important for ABS-controlled motorcycles.

Furthermore, in the maintenance phase the ABS controller continuously monitors the course of speed of the wheel. Should the acceleration into stable slippage be too slight, the ABS controller further reduces the maintenance pressure; in a corresponding manner, it carries out a slight build-up of pressure if the wheel acceleration should rise too greatly.

If a transition to smaller coefficients of friction should take place during the pressure maintenance phase so that the wheel decelerates still further into unstable slippage, the ABS controller again introduces a pressure reduction phase, which is again followed, upon renewed acceleration of the wheel, by a pressure maintenance phase.

All of these measures, carried out by the ABS controller, result in the final analysis to the wheel being brought again into stable slippage within a reasonable period of time with suitable dynamics.

It is important that the pressure function generator 4 store the wheel brake cylinder pressure (or the pressure piston setting on the wheel brake channel in question) as the acceleration pressure Pbeschl, precisely at the moment when the ABS controller again has brought the wheel back into stable slippage, and this is indicated by resetting the signal RE from logical "1" to "0" (see FIG. 3).

In the case of homogeneous pavement conditions, this pressure Pbeschl is definitely too low a value for further control, and should be exceeded in all cases in the pressure build-up phase.

Calculation of a Good Pressure start Point

When the wheel has again entered into the stable slippage region at the end of the pressure maintenance phase, the pressure build-up phase commences. The ABS controller 3 recognizes this condition on the basis of various criteria. In order for the set brake pressure to lie close to the optimum for the longest possible period of time, it is attempted first of all to produce a positive pressure jump, which leads to the result that the exponential reload function starts at a good pressure level. The pressure start point obtained by the pressure jump is referred to here as the pressure startup point PSAnf. However, it is very important for quality of the control, for the pressure jump not to lead immediately to overbraking of the wheel, since by frequent large pressure build-ups and decreases, rough behavior of the vehicle is produced. This expresses itself in the case of passenger cars by "steering wheel shimmying". Motorcycles with soft front-wheel suspensions tend to tip (lifting-off of the rear wheel) and to "buck". In order to avoid these effects, the pressure startup point PSAnf is calculated here from the previously stored locking pressure Pein and the wheel acceleration pressure Pbeschl and is further limited with due consideration of the properties of the vehicle. Each type of wheel being treated differently, according to known criteria, with respect to its axle characteristics and also with respect to the class of tires used.

In order to calculate the pressure startup point PSAnf, the arithmetic average of the locking pressure and the wheel acceleration pressure is first of all calculated, as follows:

$$PSAnf=(Pein+Pbeschl)/2$$

If a large amount of pressure (Pein−Pbeschl>DeltaPMax) was previously required in order to counteract the tendency towards wheel locking, a pressure jump does not take place to the arithmetic average of the two stored reference pressure points, but rather, the height of the jump—starting from the base value Pbeschl—is calculated from the wheel acceleration, in the pressure maintenance phase:

$$PSAnf=Pbeschl+K1*DeltaVhalt/DeltaThalt.$$

This second function is important if the previously compensated wheel overbraking was caused by a transition of the coefficient of friction to lower values. In this case, the pressure maintenance point must be considered the base value for the following reloading. The effective pressure jump then consists only of the term which is dependent on the wheel acceleration which takes into account the brake torque deficit existing during the pressure maintenance phase. The more the wheel accelerates in the holding phase, the greater is the pressure jump added to Pbeschl.

In order to prevent the jumps from producing dynamically excessively high pressure values, particularly in the case of front wheels in the event of too great a change of load, certain limit conditions which are specific to the vehicle must also be satisfied, namely:

$$PSAnf \leq Pein-DPSAnf$$

in which $$DPSAnf=f1(VREF)+f2(AREF)$$

The functions f1 and f2 result from a series of test measurements and are specific to the vehicle. In principle, the rule applies that relief of pressure, for counteracting wheel overbraking, leads to a change in load which increases with the intensity of the deceleration of the vehicle. This change in load results primarily from the springing of the front axle. Accordingly, the vehicle front wheels can be loaded less, the greater the deceleration of the vehicle is. Only very slight changes in load due to the front wheel pressure modulations occur on smooth pavement, so a wheel which has been previously released from load and then travels again in the stable slippage range can be immediately loaded again with a brake pressure which may lie just below the previous locking pressure, since practically no loss in ground contact force has taken place as a result of the relief in pressure. These effects are noticeable in particular in the case of single-track vehicles. In this case, every strong increase in pressure leads to a clear springing of the front-wheel fork; in corresponding fashion, a strong reduction in the pressure of the front wheel produces a sudden springing forwards of the fork, in which connection the dynamic loss in ground contact force can for a short time be considerably higher than would be expected on basis of the relative displacement of the center of gravity (see, for example, DE P 42 04 350.6.

In the case of rear wheels, opposite effects occur. Every release of pressure results in a loss in vehicle deceleration, so that the wheel contact force and thus the pressure loadability increase. The pressure point after counteracting a tendency towards wheel locking may therefore lie close below the previously locking pressure. This applies again in particular to single-track vehicles when only the rear wheel is braked, since in this case only the pressure modulations of the rear wheel are controlling for the changes in the wheel ground contact force.

With increasing speed of the vehicle, the pressure-startup points can be placed higher (closer below the locking pressure). In this connection, the behavior of the tire plays a decisive role.

Figure 4:
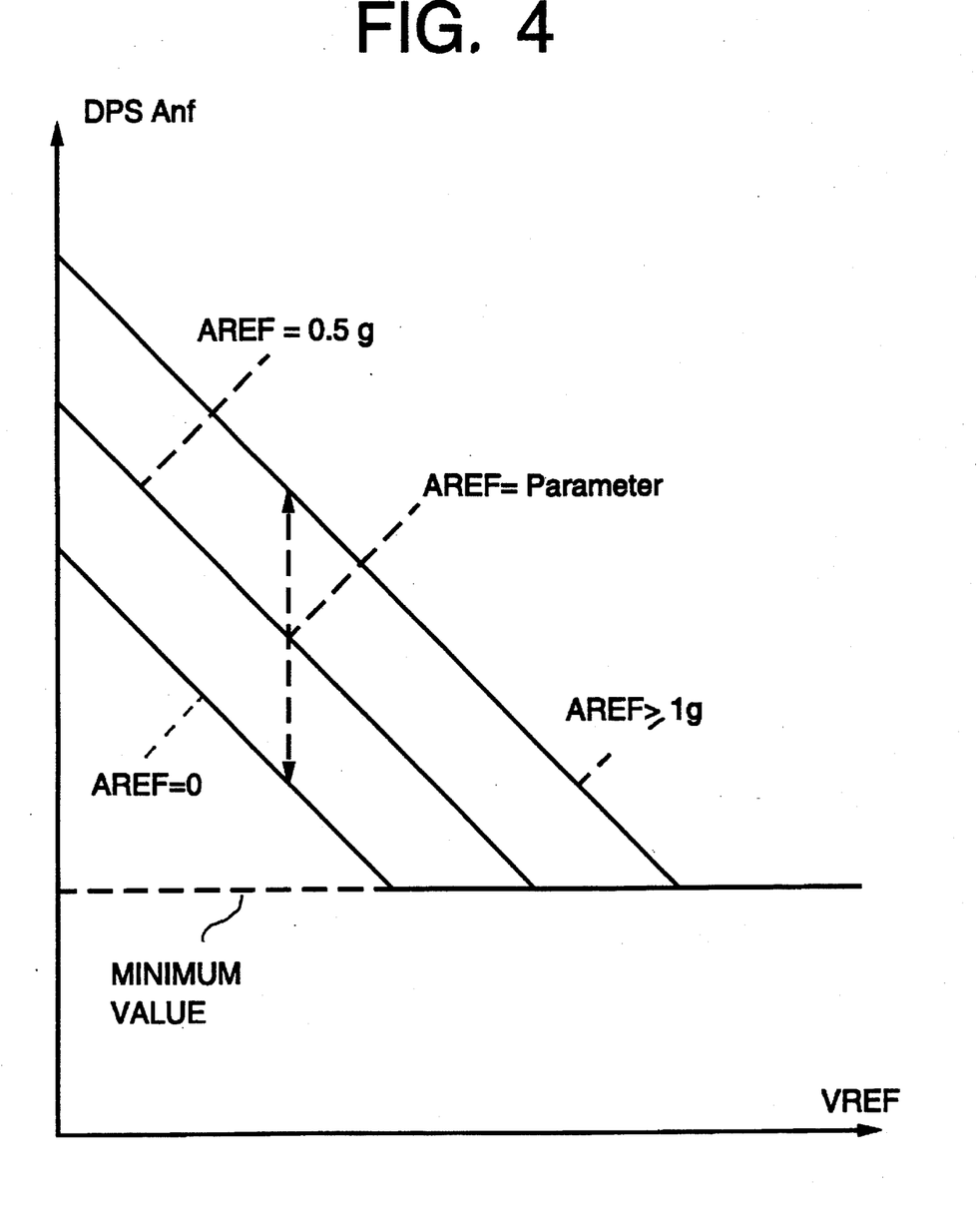
FIG. 4 is a graph showing a function used for determination of the maximum pressure start-up points.

FIG. 4 shows as example the maximum amount of pressure DPSAnf for a front wheel. As a result of the fact that the startup point PSAnf is lower, it can be assured that conditions of locking which occur rapidly one after the other—as shown in FIG. 2—practically no longer occur on uniform ground.

Exponential Pressure Build-Up Function

After switching on the pressure jump, commencing with the pressure startup point PSAnf, reached as just described, and up to the aforementioned locking pressure point Pein, an exponential on quasi exponential pressure ramp is followed, the pressure gradient being at first large and then becoming flatter and flatter upon approach to the earlier locking pressure point Pein. The following thus results for the corresponding pressure increase of a control cycle:

$$DeltaPAuf = K2*(Pein-PS) \text{ in which } K2 \ll 1$$

The new desired value of the brake pressure results simply by increasing the previous value by DeltaPAuf:

$$PSneu = PS + DeltaPAuf$$

Due to the fact that the brake pressure PS increases closer to Pein with each cycle, the pressure increase becomes constantly smaller in accordance with the above equation. This equation represents an exponential function and is shown by the broken line curve of the lower part of FIG. 3 which asymptotically approaches Pein. The obtaining of such a function on microcomputers is particularly simple by selecting as the factor a power of two. In practice, a value of ⅛ has proven satisfactory with a control cycle time of 8 msec:

$$DeltaPAuf = (Pein-PS)/8$$

In order that the locking pressure can also actually be reached and the ramp does not merely travel asymptotically towards this pressure point, a minimum increase is required, namely:

$$DeltaPAuf \geq DeltaPMin$$

This represents a quasi-exponential function, one comprising a combination of an exponential function and a linear function. This is shown by the solid line of the lower graph of FIG. 3.

The value of DeltaPMin must be set in a manner specific to vehicle and wheel. In particular, it is to be ensured that DeltaPMin is large enough that the reloading ramp leads in all cases after about 300 msec to a slight tendency towards wheel locking. Due to the exponential loading profile a high pressure level is obtained quickly. Furthermore, in this way, the startup point PSAnf can be placed relatively low in accordance with the function shown in FIG. 4 without the further course of the pressure being too low.

In all the pressure and pressure-difference values considered in the above-indicated equations, relative values are concerned, i.e., no knowledge of the absolute values of the pressures is necessary for the correct handling of the control process and strategy. It is sufficient that the pressure profile shown in FIG. 3 is passed through according to the correct relations, which can be achieved by the plunger pressure modulator described below without expense via the measurable plunger positions.

Possibilities of the Plunger Principle

In anti-lock systems which operate on the basis of the plunger principle, the wheel brake pressures can be set via control of the positions of their plunger pistons. If the position of the plunger piston is determined by a movement-measuring device, the ABS controller continuously has information available to it concerning the relative pressure that has been attained.

Figure 5:
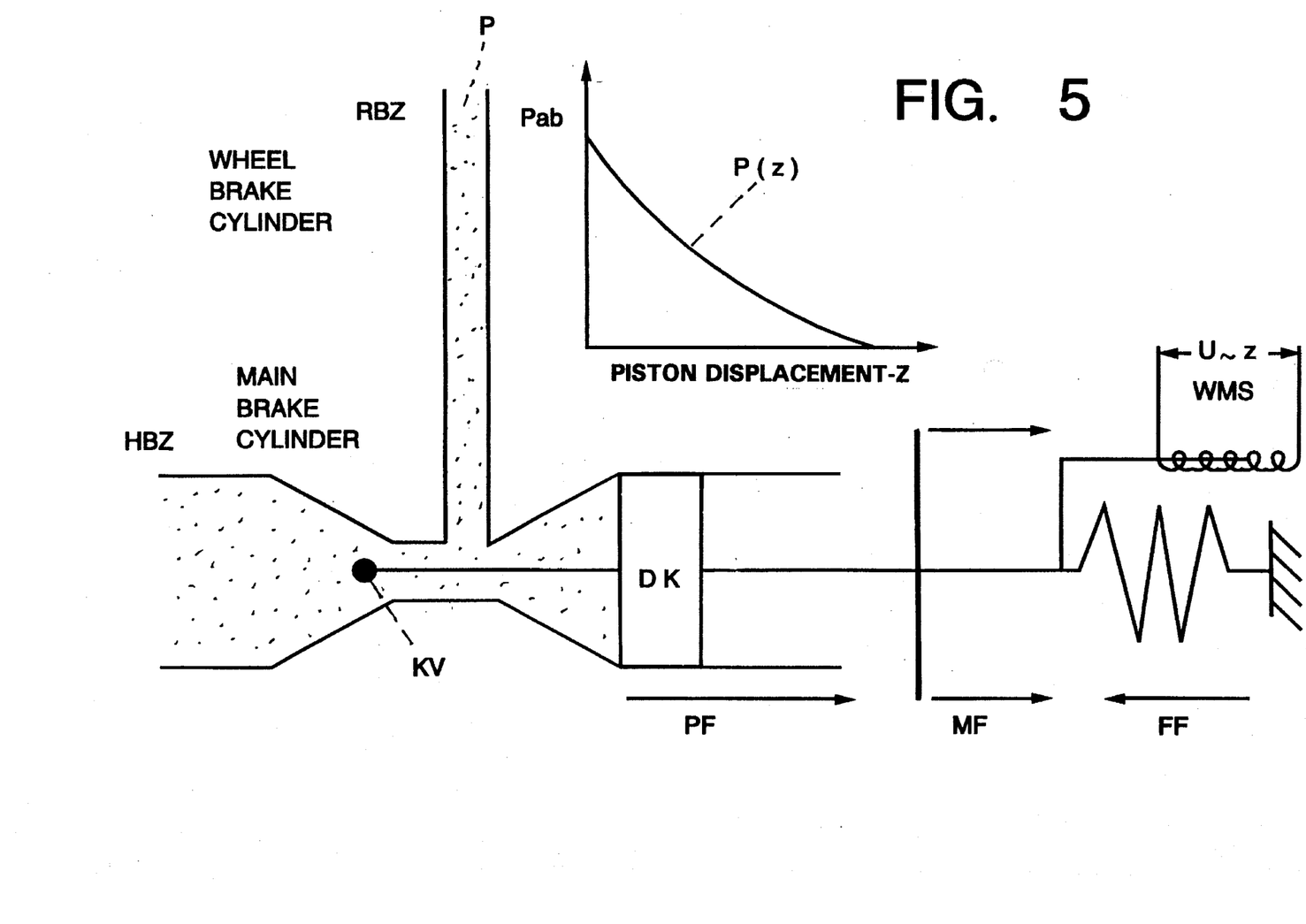
FIG. 5 is a schematic diagram illustrating the pressure build-up in a single-channel plunger pressure modulator with a piston-displacement measurement system.

FIG. 5 shows the operating principle for a motorcycle. Upon normal braking, the pressure of the main brake cylinder (HBZ) applied by the driver passes directly into the wheel cylinder brake circuit (RBZ). In the event of a recognized overbraking, the ABS controller controls a motortractive force (MF) so that the pressure piston (DK) is pushed via a lever against the force (FF) of a compression spring, with the aid of the internal pressure force (PF) on the piston in the direction of increasing piston displacement z. As soon as a slight displacement of the piston has occurred, the ball valve (KV) closes so that the wheel brake cylinder pressure is disconnected from the main brake cylinder pressure and the pressure Pab is enclosed within the wheel brake circuit. The further the piston is now displaced in the direction of displacement z, the more strongly the pressure is reduced, due to the elasticities present in the brake system. Starting with the enclosed pressure Pab, a pressure function which decreases towards 0 is carried out over the displacement range z, extending linearly or slightly digressively depending on the brake system. A new pressure build-up is obtained by displacement of the piston in the direction of the smaller z values so that the motortractive force (MF) is reduced to such an extent that the compression force (FF) of the spring again exceeds the sum of the active opposing forces (PF) and (MF) as well as the passive frictional forces of the system. The position z the piston has reached therefore directly represents, via a predetermined pressure-displacement function, a brake pressure relative to the enclosed pressure Pab. As long as the ball valve (KV) remains closed, there is an unambiguous relationship between piston displacement z and brake pressure P. All pressure values referred to hereinabove can therefore be replaced by displacement values z, as indicated, for example, by an inductive measurement coil WMS. Further, all pressure difference amounts (pressure decrease and pressure build-up gradients) are replaced by displacement increments. Because of its analog properties, the plunger modulator is furthermore able to follow very precisely along the fine displacement and pressure profiles shown in FIG. 3.

Figure 6:
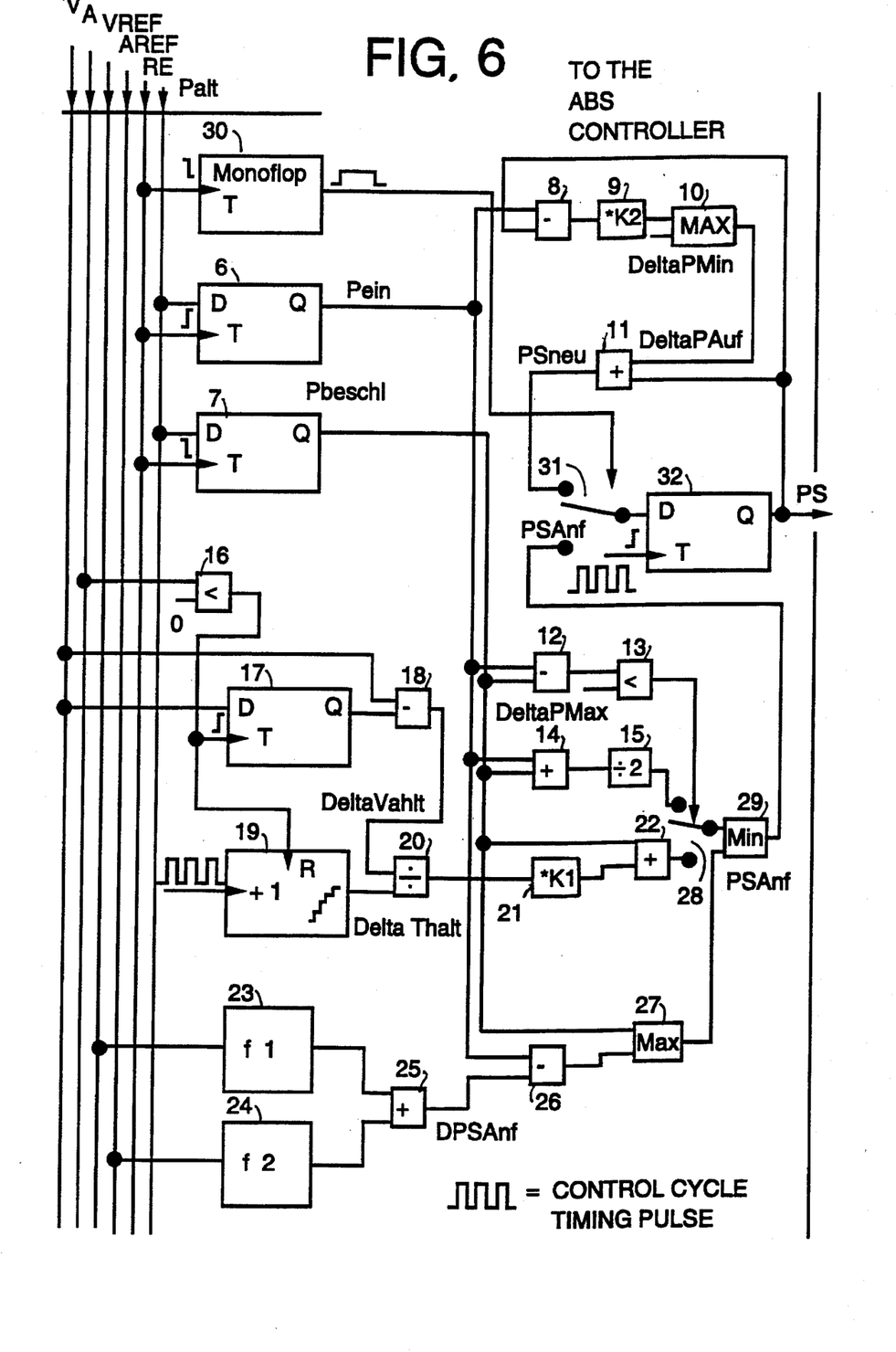
FIG. 6 shows an embodiment of a circuit that can be used in the pressure function generator of the invention and FIG. 7 is a graph showing the friction $\mu$ between tire and road surface as a function of the slippage s.

FIG. 6 shows an embodiment of a circuit that can be used in accordance with the invention as the pressure function generator 4. By means of the register 6, the circuit stores the wheel brake pressure Palt precisely at the time when the ABS controller switches the signal RE from "0" to "1" and thus indicates that a tendency towards the locking of a wheel has been recognized. If, by brake pressure control of the ABS controller the wheel has again come into a stable slippage region, so that the controller resets the signal RE again to "0", then the register 7 which is triggered by a negative signal clock edge takes over the wheel brake pressure Palt as a reference pressure point Pbeschl.

In order to calculate the startup point PSAnf, two different methods are carried out.

The adder 14 and divider 15 perform the formation of an average value between the two reference pressures Pein and Pbeschl in order to form PSAnf.

As an alternative, the components 16 to 21 calculate a value for PSAnf which consists of the sum of the pressure maintenance value Pbeschl and a term which is dependent on the wheel acceleration. In order to determine the wheel acceleration during the pressure maintenance phase, the register 17 records the wheel speed V at the time when the wheel definitely accelerates again. This is caused by the comparator 16 which compares the wheel acceleration A with 0, and at the time of switching from wheel deceleration to wheel acceleration (A changes from positive to negative values) connects a positive clock signal edge to the register. At the same time, the maintenance phase counter 19 is set to 0 by applying a signal to the reset input R of 19. In each further control cycle, the reading of the counter of 19 is now increased by 1 since the control cycle pulse is placed on the clock input of the counter 19. The subtractor 18 continuously forms the difference between the wheel speed V actually reached and the speed VMin stored in the register 17. The difference DeltaVhalt, and therefore the amount by which the wheel was again accelerated, is divided in the divider 20 by the reading of counter 19, namely the duration of the pressure maintenance phase, and provided furthermore with the standardizing factor K1 by means of the multiplier 21. The pressure portion calculated in this manner is added by the adder 22 to the maintenance pressure Pbeschl.

As mentioned above, one of two methods of calculation is selected for the formation of the startup pressure point. If the difference between the locking pressure Pein and the maintenance pressure Pbeschl is less than DeltaPMax, then the first method of calculation is selected. For this purpose, the subtractor 12 forms the difference between Pein and Pbeschl, and the comparator 13 checks whether this exceeds the amount Delta PMax.

If it is less than said amount then the comparator 13 applies a logical "0" to the multiplexer 28, so that the value of the first method of calculation is connected to the minimum detector 29.

The latter checks whether the calculated value for PSAnf is not too high. For this purpose the components 23 to 27 in accordance with FIG. 4 form a maximum function for PSAnf, which for reasons of the dynamics of the vehicle must not be exceeded by the calculated value. Depending on the reference speed VREF of the vehicle and the vehicle reference deceleration AREF, the function blocks 23 and 24 calculate portions of pressure which are first of all added by the adder 25 and subtracted by the subtractor 26 from the locking pressure (Pein). The maximum detector 27 connects this value to its output if it is greater than the maintenance pressure Pbeschl; otherwise Pbeschl is itself outputted. The minimum detector 29 limits the value calculated for PSAnf finally to the maximum value formed by 27. The final value of PSAnf is stored at the start of the pressure build-up phase into the register 32, in such a manner that the monoflop 30 triggered by the falling edge of RE produces a positive pulse which is present at the multiplexer 31 for about 1.5 control cycles, so that this PSAnf switches to the data inputs of register 32. The value is then taken over with the next rising edge of the control cycle clock into the register 32 as a ramp function value PS. The length of the monoflop pulse is so selected that the valid value of PSAnf is also actually present at the time of take-over.

The pressure function generator it forms the further course of the pressure ramp with the components 8 to 11 in such a manner that the subtractor 8 always calculates the difference between the stored locking pressure Pein and the desired value of the wheel brake pressure PS reached in the previous control cycle. The multiplier 9 provides this difference with the constant factor K2. Via the maximum detector 10 the amount of the pressure is further limited to the minimum DeltaPMin. The resultant amount of pressure DeltaPauf by which the brake pressure reached is to be increased within the existing control cycle is added by means of the adder 11 to the pressure default value PS currently stored in register 32 and recorded with the next rising edge of the control cycle clock as a new value of PS, since the multiplexer 31 now connects the upper channel to the register 32 by the return of the monoflop pulse.

During the pressure build-up phase (RE="0") the ABS controller merely has the job of taking over the pressure default values PS and setting them by means of the pressure modulator.

In practice, it has been found that the calculation of pressure build-up functions with exponential profiles which are suitable for the vehicle leads to clearly improved control braking, as compared with the linear pressure curves previously used. The states of locking of the wheels which follow shortly one after the other in the example in FIG. 2, particularly in the case of motorcycles with high wheel and axle dynamics, cause a considerable reduction in comfort and in brake deceleration. These states can be practically completely avoided on uniform ground, by controlling the system, before the termination of the exponential pressure ramps suitably in response to the pressure startup point PSAnf, in accordance with the equations given.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An anti-lock control system for improving comfort and shortening braking distances in automotive vehicles having wheel sensors, a monitoring circuit which recognizes over-braking conditions of the wheels based on signals from the sensors and produces corresponding control signals, and a pressure modulator which, by means of the control signals, sets the brake pressures on the vehicle wheels; the anti-lock control system further comprising:

a pressure function generator which is responsive to the monitoring circuit and which, for each wheel, determines the brake pressure whenever wheel overbraking has been detected as an upper reference pressure (Pein); determines a brake pressure at which the wheel again accelerates, after pressure reduction by the pressure modulator in a pressure reduction phase, as a lower reference point (Pbeschl); and thereupon, in a pressure build-up phase, controls the pressure modulator so as to increase the wheel brake pressure from a start point (PsAnf) between the upper and lower reference pressure points over the entire pressure build-up phase initially in accordance with an exponential function approaching an asymptote and thereafter as a quasi-exponential function crossing said asymptote.

2. An anti-lock control system according to claim 1, wherein the pressure function generator is operative, when the difference between the upper and the lower reference points is large and therefore a strong reduction in pressure was necessary in order to compensate for the tendency toward wheel locking, to employ the lower reference point (Pbeschl) as the start point (PSAnf) for the pressure build-up phase.

3. An anti-lock control system according to claim 1, wherein the pressure function generator is operative, when the difference between the upper and the lower reference points is large and therefore a strong reduction in pressure was necessary in order to counteract the tendency toward wheel locking, and when a large wheel acceleration has taken place during a pressure maintenance phase following the pressure reduction phase, to determine the start point (PSAnf) of the pressure build-up phase from the sum of the lower reference point and a term dependent on the wheel acceleration, the part dependent on the wheel acceleration being formed from the average wheel acceleration in the pressure maintenance phase multiplied by a constant factor.

4. An anti-lock control system according to claim 1, wherein the pressure function generator is operative, when the difference between the upper and lower reference points is small and therefore only a slight pressure reduction was necessary in order to counteract the tendency toward wheel locking, to determine the start point (PSAnf) of the pressure build-up phase as an arithmetic mean value of the upper and lower reference pressure points.

5. An anti-lock control system according to any one of claims 1 to 4, wherein the maximum value of the start point (PSAnf) for the pressure build-up phase is limited to a value which is formed from the upper reference pressure point (Pein), reduced by a constant pressure amount.

6. An anti-lock control system according to any one of claims 1 to 4, wherein a maximum value of the start point (PSAnf) for the pressure build-up phase is limited to a value which is formed from the upper reference pressure point (Pein), reduced by an amount which is dependent on the speed of the vehicle, said amount decreasing with increasing speed so that a higher start point (PSAnf) results with higher speeds.

7. An anti-lock control system according to claim 6, wherein the amount dependent on the vehicle speed is further augmented by an amount dependent on the vehicle deceleration, said amount increasing with increasing deceleration so that a lower start point (PSAnf) results with higher decelerations.

8. An anti-lock-control system according to any one of claims 1 to 4, wherein the exponential or quasi-exponential function is limited to a minimum slope in order to ensure that the upper reference pressure point is not only reached asymptotically but is also exceeded after a finite time.

9. An anti-lock control system according to claim 5, wherein the exponential or quasi-exponential function is limited to a minimum slope in order to ensure that the upper reference pressure point is not only reached asymptotically but is also exceeded after a finite time.

10. An anti-lock control system according to claim 6, wherein the exponential or quasi-exponential function is limited to a minimum slope in order to ensure that the upper reference pressure point is not only reached asymptotically but is also exceeded after a finite time.

11. An anti-lock control system according to claim 7, wherein the exponential or quasi-exponential function is limited to a minimum slope in order to ensure that the upper reference pressure point is not only reached asymptotically but is also exceeded after a finite time.

12. A method of improving comfort and shortening braking distances in anti-lock control systems of automotive vehicles having wheel sensors, a monitoring circuit which recognizes overbraking conditions of the wheels based on signals from the sensors and produces corresponding control signals, and a pressure modulator which, by means of the control signals, sets the brake pressures on the vehicle wheels; the method comprising the steps of:

for each wheel, determining the brake pressure whenever wheel overbraking has been detected as an upper reference pressure (Pein);

determining a brake pressure at which the wheel again accelerates, after pressure reduction by the pressure modulator in a pressure reduction phase, as a lower reference point (Pbeschl); and thereupon, in a pressure build-up phase, increasing the wheel brake pressure over the entire pressure build-up phase between the upper and lower reference points initially in accordance with an exponential function approaching an asymptote and thereafter as a quasi-exponential function crossing said asymptote.

13. A method according to claim 12, further comprising the steps of, when the difference between the upper and the lower reference points is large and therefore a strong reduction in pressure was necessary in order to compensate for the tendency toward wheel locking, employing the lower reference point (Pbeschl) as a start point (PSAnf) for the pressure build-up phase.

14. A method according to claim 12, further comprising the steps of, when the difference between the upper and the lower reference points is large and therefore a strong reduction in pressure was necessary in order to counteract the tendency toward wheel locking, and when a large wheel acceleration has taken place during a pressure maintenance phase, following the pressure reduction phase, determining a start point (PSAnf) of the pressure build-up phase from the sum of the lower reference point and a term dependent on the wheel acceleration, the part dependent on the wheel acceleration being formed from the average wheel acceleration in the pressure maintenance phase multiplied by a constant factor.

15. A method according to claim 12, further comprising the steps of, when the difference between the upper and lower reference points is small and therefore only a slight pressure reduction was necessary in order to counteract the tendency toward wheel locking, determining the start point (PSAnf) of the pressure build-up phase as an arithmetic mean value of the upper and lower reference pressure points.

16. A method according to claim 12, further comprising the steps of limiting a maximum value of a start point (PSAnf) for the pressure build-up phase to a value which is formed from the upper reference pressure point (Pein), reduced by a constant pressure amount.

17. A method according to claim 12, further comprising the steps of limiting a maximum value of a start point (PSAnf) for the pressure build-up phase to a value which is formed from the upper reference pressure point (Pein), reduced by an amount which is dependent on the speed of the vehicle, said amount decreasing with increasing speed so that a higher start point (PSAnf) results with higher speeds.

18. A method according to claim 17, further comprising the steps of augmenting the amount dependent on the vehicle speed by an amount dependent on the vehicle deceleration, said amount increasing with increasing deceleration so that a lower start point (PSAnf) results with higher decelerations.

19. A method according to claim 12, further comprising the steps of limiting the exponential or quasi-exponential function to a minimum slope in order to ensure that the upper reference pressure point is not only reached asymptotically but is also exceeded after a finite time.

* * * * *